United States Patent [19]

Onitsuka et al.

[11] 4,430,612
[45] Feb. 7, 1984

[54] ELECTRIC TYPE SPEED METER

[75] Inventors: Nobuyuki Onitsuka; Masaaki Fukamachi; Masahiko Sueyoshi, all of Miyazaki, Japan

[73] Assignee: Kabushiki Kaisha Honda Rukku, Miyazaki, Japan

[21] Appl. No.: 304,569

[22] Filed: Sep. 22, 1981

[30] Foreign Application Priority Data

Sep. 22, 1980 [JP] Japan ................. 55-130599

[51] Int. Cl.$^3$ ............................................. G01P 3/489
[52] U.S. Cl. ..................................................... 324/166
[58] Field of Search ............................. 324/166–169; 318/603, 685, 698; 340/670–671

[56] References Cited

U.S. PATENT DOCUMENTS 4,083,052 4/1978 Metcalf.
4,227,150 10/1980 Widl ................................ 324/166 X

FOREIGN PATENT DOCUMENTS 42691 12/1981 European Pat. Off. ............ 324/166

Primary Examiner—Stanley T. Krawczewicz
Assistant Examiner—Jose M. Solis
Attorney, Agent, or Firm—Armstrong, Nikaido, Marmelstein & Kubovcik

[57] ABSTRACT

The present invention is directed to an electric type speed meter which comprises a pulse generating means for generating a pulse signal corresponding to a vehicle speed. A control circuit means counts the number of output pulses of the pulse generating means during predetermined time intervals and discriminates between a positive and negative difference between the number of pulses counted during a predetermined time interval and the number of pulses counted in a preceding time interval. The control circuit means generates a pulse signal corresponding to the difference therebetween. A pulse motor driving circuit applies the output of the control circuit means to a pulse motor for controlling the pulse motor in either a forward or reverse direction. An indicator means is operable in response to the pulse motor for indicating a speed corresponding to the speed thereof.

2 Claims, 10 Drawing Figures 1 pulse generating means
2 control circuit
3 pulse motor driving circuit

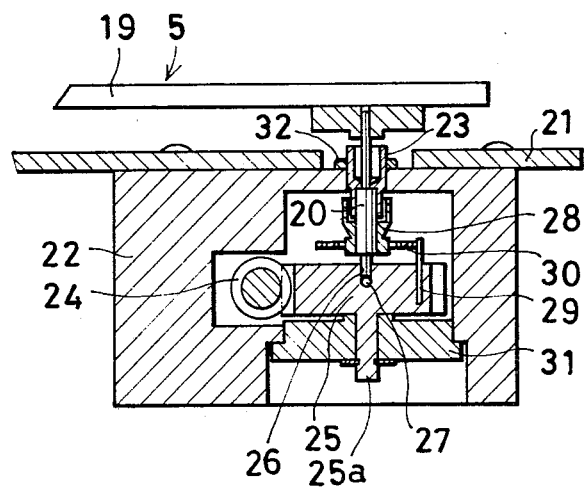

ELECTRIC TYPE SPEED METER

BACKGROUND OF THE INVENTION

1. Field of the Invention

This invention relates to an electric type speed meter for a pulse motor for use with a motorcar.

2. Description of the Prior Art

In prior art speed meters for use with electric cars, a feedback control system is used as a system for controlling a pulse motor constituting a driving power source thereof.

In the feedback system, it always requires a position detecting means, and accordingly additional space is required for receiving the position detecting means and consequently the entire apparatus becomes large and at the same time the position detecting means is poor in reliability.

SUMMARY OF THE INVENTION

It is the primary object of the present invention to provide an electric speed meter for use with a pulse motor which eliminates the requirement for position detecting means which are necessary in prior art devices.

It is another object of the present invention to provide an electric type speed meter in which a pulse motor is controlled to rotate in either a forward or reverse direction by comparing the rotational speed of the motor in a predetermined time interval with that of a preceding time interval and then comparing the difference therebetween with a predetermined motor control signal.

The present invention is directed to an electric type speed meter which comprises a pulse generating means for generating a pulse signal corresponding to a vehicle speed. A control circuit means counts the number of output pulses of the pulse generating means during predetermined time intervals and discriminates between a positive and negative difference between the number of pulses counted during a predetermined time interval and the number of pulses counted in a preceding time interval. The control circuit means generates a pulse signal corresponding to the difference therebetween. A pulse motor driving circuit applies the output of the control circuit means to a pulse motor for controlling the pulse motor in either a forward or reverse direction. An indicator means is operable in response to the pulse motor for indicating a speed corresponding to the speed thereof.

BRIEF DESCRIPTION OF THE DRAWINGS

FIGS. 3A to 3G illustrate the various signals generated in the control circuit shown in FIG. 2.

FIG. 4 is a sectional view of a speed indicator of the present invention.

DETAILED DESCRIPTION OF THE PREFERRED EMBODIMENT

Figure 1:
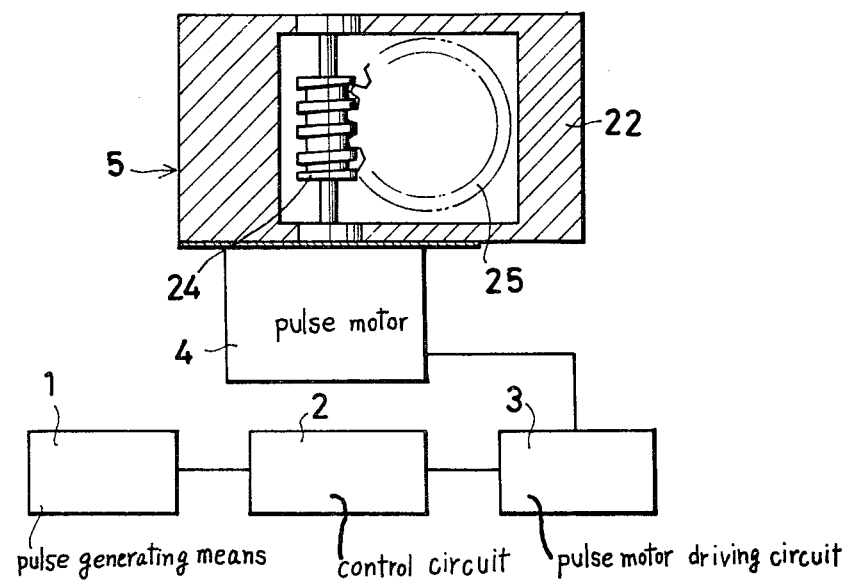
FIG. 1 is a schematic view of a speed meter of the present invention.

As shown in FIG. 1, a speed meter of this invention comprises a pulse generating means 1 arranged to generate a pulse signal corresponding to a vehicle speed and a control circuit 2 arranged to count the number of output pulses of the pulse generating means 1 during predetermined time intervals and discriminate between positive and negative differences in the number of the pulses between a number counted during a present interval and a number counted during the preceding time interval and to generate pulse motor driving pulses of a number corresponding to the difference. A pulse motor driving circuit 3 is provided for applying the output pulses of the control circuit 2 in sequence to coils of plural poles of a pulse motor 4. The pulse motor 4 is arranged to be rotated in the forward direction or in the reverse direction according to the output pulses of the pulse motor driving circuit 3, and the pulse motor 4 is connected to an indicator 3 as a driving source thereof.

Figure 2:
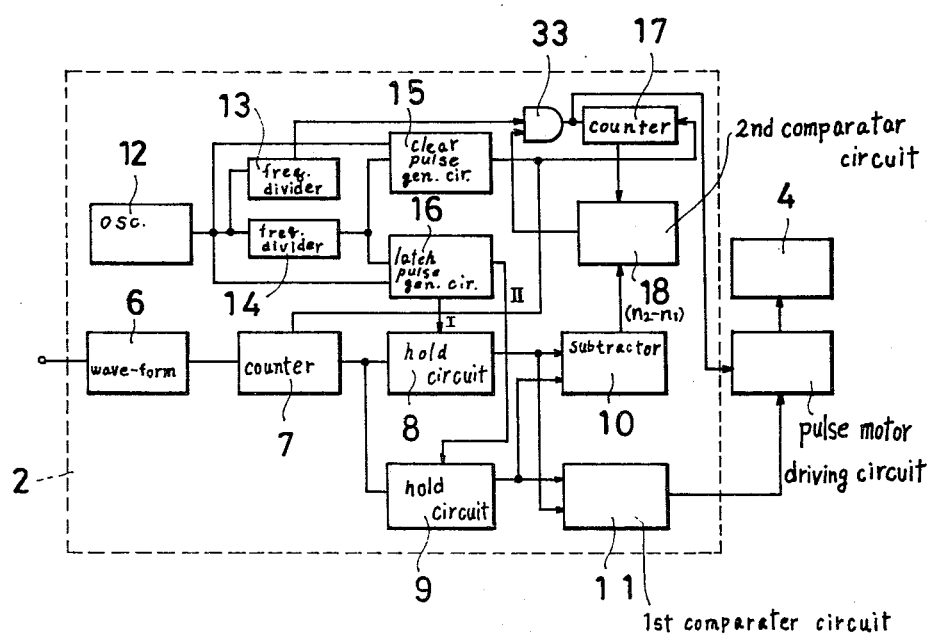
FIG. 2 is a schematic diagram of the control circuit thereof.

The foregoing pulse generating means 1 is so arranged that pulses which are in proportion to the rotational speed are generated, as an alternating current signal, through an electromagnetic pickup provided very near a gear attached to a wheel shaft of a vehicle. The alternating current signal is applied to the control circuit 2 shown in FIG. 2, and is first converted through a wave-form shaping circuit 6 into a series of square wave pulses corresponding to the rotational speed of a vehicle wheel as shown in FIG. 3A, and is then counted by a counter 7 during each time period $T_o$ set by a second frequency divider 14 as shown in FIG. 3B. Stable high frequency pulses are emitted from a standard oscillation circuit 12, and the pulses are switched between "ON" and "OFF" at the end of each time period $T_o$ (0-.1-0.2 second in this invention), by the second frequency divider 14 as shown in FIG. 3B. At the leading edge of the ON pulse, a latch pulse II is generated as shown in FIG. 3C and at the leading edge of the OFF pulse a latch pulse I is generated as shown in FIG. 3D by a latch pulse generating circuit 16. A clear pulse generating circuit 15 generates a clear pulse rising when the latch pulses I and II fall respectively as shown in FIG. 3E. The time t of each of the latch pulses I and II is set as to be much shorter than the input frequency. The latch pulse I acts to operate a D type flip-flop 8, and the latch pulse II acts to operate a D type flip-flop 9. Further, after the counted number in the counter 7 is held by the latch pulses I and II by the flip-flops 8 and 9, the counted number in the counter 7 and the counted number in a counter 17 are cleared at the same time by the clear pulse of the clear pulse generator 15. Thus, the counted number of pulses in the counter 7 are alternately applied to and held by the flip-flops 8 and 9. As shown in FIG. 3E, a counter number $n_1$ counted at an earlier time $T_1$ is applied to and held by the flip-flop 8 and a counter number $n_2$ counted at the subsequent time $T_2$ is applied to and held by the flip-flop 9.

The pulse counts $n_1$, $n_2$ held respectively by the flip-flops 8 and 9 are applied to a first comparator circuit 11 and a subtractor circuit 10. Comparator circuit 11 makes a comparison between the two and in the case of $n_2 < n_1$ a forward rotation signal, in the case of $n_2 = n_1$, a stop signal, and in the case of $n_2 < n_1$, a reverse rotation signal is applied to the pulse motor driving circuit 3. At the same time, the subtractor circuit 10 calculates an absolute value $\lambda |n_2 - n_1|$ and provides a number of pulses corresponding to that difference which is applied to a second comparator circuit 18.

The output of the second comparator circuit 18 is applied to an AND gate 33. The second comparator circuit 18 compares the difference pulse number value and the number value of pulses from a counter 17. The voltage level of an output thereof is so set that when the counted value in the counter 17 is smaller than the calculated value of the subtractor 10, the voltage level is high and when the two values are equal to each other the voltage level is low. The counter 17 is connected to a standard oscillation circuit 12 through the AND gate 5 and a frequency divider 13, and serves to count the series of pulses of a proper frequency for driving the motor 4 (FIG. 3G) which is applied to the motor 4 through the AND gate 33 from the frequency divider 13, when the AND gate is opened, and is so arranged that the same begins its counting from the trailing edge of the clear pulse (FIG. 3E).

Thus, when the counted number value in the counter 17 is smaller than that of the subtractor circuit 10, the AND gate 33 is opened by the high level voltage applied from the second comparator circuit 18, and when the two counted values as above become equal to each other, the same is closed by the low level voltage. Thus, during the time that the counted value in the counter 17 is smaller than that of the subtractor circuit 10, the pulses for driving the pulse motor are applied to the pulse motor driving circuit 3, and when the counter 17 counts the number correspnoding to the foregoing difference number value, the AND gate 33 is closed by the output of the second comparator circuit 18. Consequently, only the counted value of the subtractor circuit 10 shown in FIG. 3F, that is, only the pulse number which is equal to the pulse number difference $|n_2-n_1|$ is appled into the pulse motor driving circuit 3.

Thus, the control circuit of this invention fulfills such a function that a frequency corresponding to a vehicle speed is shaped into a square wave and thereafter is counted in sequence at set time intervals and pulses for driving the pulses motor that is equal in number to a pulse number difference between the value counted during a time interval and the value counted in the preceding interval and when that value of the difference is positive, a forward rotation signal is applied to the pulse motor driving circuit and when the same is negative, the reverse rotation signal is applied thereto.

Next, one example of the indicator 5 for indicating a speed by means of a pointer thereof which is rotated according to the forward rotation, the reverse rotation and the stop of the pulse motor 4 will be explained with reference to FIG. 4.

A pointer shaft 20 having at its forward end a pointer 19, is supported at its middle portion through a bearing 23 by a frame body 22 having an indication dial plate 21. Its lower portion is supported through a ball 27 by a bearing opening 26 made in the axial center of a worm wheel 25 meshed with a worm 24 mounted on a rotary shaft of the pulse motor 4. Between the shaft bearings 23 and 26, an oil cup 28 is provided which is filled with a brake oil for soaking therein a lower portion of the foregoing bearing 23 and the oil cup 28 and an eccentric pin 29 which is so provided on the foregoing worm wheel 25 as to be eccentrically positioned in relation to the oil cup 28, are interconnected through a spiral spring 30.

Referring to the drawing, a bearing plate 31 is provided on the frame body 22 for supporting through a rotary shaft 25a, the worm wheel 25 and fastening nut 32 fixes the bearing 23 to the frame body 22.

With this invention constructed as above, the frequency pulses generated from the pulse generating means 1 corresponding to a vehicle speed are shaped into square waves and thereafter are counted in sequence during predetermined time intervals. Pulse motor driving pulses which are equal to a difference between the present counted value and the preceding counted value, and a forward or reverse rotation signal of the pulse motor are generated, and the driving pulses and the forward or reverse rotation signal are distributed in sequence to coils of plural poles of the pulse motor 4 through the pulse motor driving circuit 3 to rotate the motor 4 in forward or reverse. Accordingly, when the vehicle speed is in the direction of acceleration, the signal applied from the control circuit 2 to the pulse motor driving circuit 3 is the forward rotational signal for the pulse motor 4 and the pulse motor driving pulses which are equal to the difference between the number of pulses counted in a present predetermined interval and the number of pulses counted in the preceding interval $T_0(0.1-0.2$ second), and thereby the pulse motor 2 is rotated in the forward direction by a degree corresponding to that number of pulses. Thus, the pointer 20 is turned through the spiral spring 30 as a result of rotation of the worm wheel 25 which is rotated in the clockwise direction through the worm 24 which is integral with the motor shaft, so as to point a certain graduation speed on the dial plate 21.

Thus, according to this invention, a pulse motor is controlled in its forward or reverse rotation or stop by a difference in pulse count between a value counted during a predetermined interval and a value counted in a preceding time interval, and consequently the providing of a position detecting means in a control circuit becomes unnecessary and an entire apparatus can be simplified.

In addition, since the control circuit can be wholly constructed by digital circuits, the same can be in a microcomputer of one chip and can be a compact and high precise circuit.

In addition, the indicator is so constructed that a worm wheel meshed with the pulse motor shaft and a pointer shaft are moved with each other through a spiral coil and may be damped by a damper oil, so that in spite of a direct connection between the pulse motor and the driving worm, a smooth movement of the pointer can be obtained.

The present invention may be embodied in other specific forms without departing from the spirit or essential characteristics thereof. The presently disclosed embodiments are, therefore, to be considered in all respect as illustrative and not restrictive, the scope of the invention being indicated by the appended claims, rather than the foregoing description, and all changes which come within the meaning and range of equivalency of the claims are, therefore, to be embraced therein.

What is claimed is:

1. An electric speed meter comprising a pulse generating means for generating a pulse signal corresponding to a vehicle speed, a control circuit means for counting the number of output pulses of the pulse generating means during predetermined time intervals and for discriminating between a positive and negative difference between the number of pulses counted during a predetermined time interval and the number of pulses counted in a preceding time interval and for generating a pulse signal corresponding to the difference therebetween, a pulse motor driving circuit for applying in sequence the output pulses of the control circuit means to a pulse motor for controlling the pulse motor in either a forward direction or a reverse direction and an indicator means operable in response to the pulse motor for indicating a speed corresponding to the speed of the vehicle, wherein said control circuit means comprises a counter means for counting the number of pulses generated by the pulse generating means, holding circuit means for counting and holding the number of pulses counted by the counter means during the predetermined time interval and a preceding time interval, a first comparator means coupled to the pulse motor for discriminating between the positive and negative difference of the values of the holding circuit means and generating either a forward rotational signal or a reverse rotational sigal for the pulse motor, subtractor circuit means coupled to the holding circuit means for providing a difference between the number of pulses counted during each time interval and during the preceding time interval, oscillator means for generating pulses corresponding to a predetermined motor rotational speed, second counter means for counting the number of pulses applied to the pulse motor by the oscillator means, second comparator means for comparing the output of the subtractor means and the second counter means and an AND circuit having one input coupled to the oscillator means and the other input coupled to the second comparator means and the output thereof coupled to the motor and the second counter means, wherein the number of pulses applied to the motor by the oscillator means is controlled and the rotational speed of the motor is thereby controlled.

2. An electric type speed meter as claimed in claim 1, wherein the indicator means is coupled to the driving shaft of the pulse motor through a damper means.

* * * * *

UNITED STATES PATENT AND TRADEMARK OFFICE
CERTIFICATE OF CORRECTION

PATENT NO. : 4,430,612
DATED : February 7, 1984
INVENTOR(S) : NOBUYUKI ONITSUKA ET AL It is certified that error appears in the above-identified patent and that said Letters Patent is hereby corrected as shown below:

On the cover page, Item [73], change "Kabushiki Kaisha Honda Rukku, Miyazaki, Japan" to --- Honda Giken Kogyo Kabushiki Kaisha, Tokyo, Japan ---.

Signed and Sealed this

Twenty-fifth Day of September 1984

[SEAL]

Attest:

GERALD J. MOSSINGHOFF

Attesting Officer     Commissioner of Patents and Trademarks